March 3, 1931.   S. M. KASS   1,794,905
PIPE JOINT
Filed Oct. 1, 1925
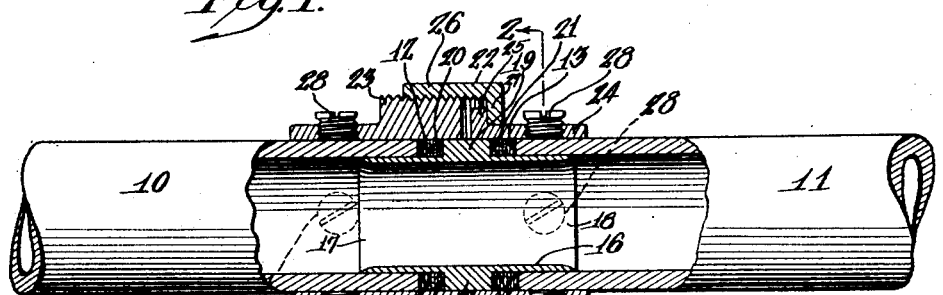
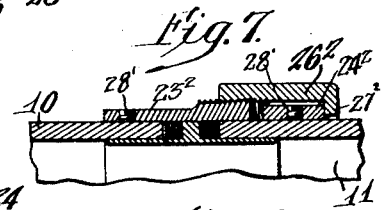
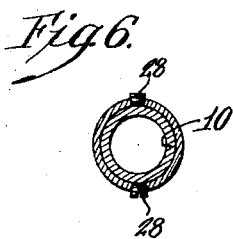
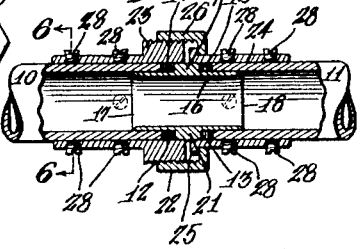
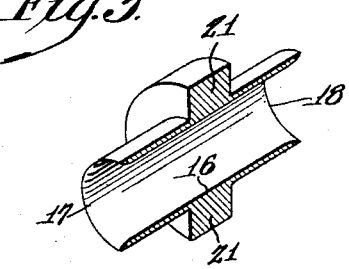
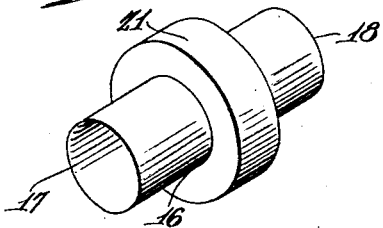
Inventor
Samuel M. Kass Patented Mar. 3, 1931

1,794,905

UNITED STATES PATENT OFFICE

SAMUEL M. KASS, OF PHILADELPHIA, PENNSYLVANIA

PIPE JOINT

Application filed October 1, 1925. Serial No. 59,788.

My invention relates to pipe joints intended for temporary and also for permanent use in uniting the ends of piping.

The purpose of my invention is to form a quick and secure union between pipe ends without necessity for threading them, particularly suited for householder's use.

A further purpose is to insert a thimble or sleeve within and between adjoining pipe ends and to form a seal by annular gaskets located between the facing ends of the two pipes and an intermediate ring or shoulder upon the thimble or sleeve.

A further purpose is to secure coupling parts upon unthreaded ends of the pipe and by them to draw the pipe ends together over a packing-carrying sleeve.

A further purpose is to displace sleeve couplings by union couplings.

Further purposes will appear in the specification and in the claim.

I prefer to illustrate my invention by one main form only and slight modifications of it, among the forms in which it may appear, selecting a form which is effective and inexpensive and which at the same time well illustrates the principles of my invention.

Figure 1 is an elevation partly in central longitudinal section showing two pipes and a joint between them.

Figure 2 is a section of Figure 1 taken upon line 2—2.

Figures 3 and 4 are a sectional perspective and a full perspective of the thimble or sleeve upon which the packing is carried.

Figures 5 and 7 are elevations partially in longitudinal section of modified forms of my invention.

Figure 6 is a section upon lines 6—6 of Figure 5.

In the drawings similar numerals indicate like parts.

There has often been difficulty, particularly "on the job" in lining up long pipes sufficiently to connect their threaded ends by sleeve couplings.

The pipes 10 and 11 are faced at their ends 12 and 13 to cooperate with packing 14 and 15 carried by a thimble 16. The packing may be of any character suitable for the intended purpose; of rubber, for example, where the term of its intended use does not require a more lasting packing, but of fibre or other suitable material for more lasting forms.

The ends 17 and 18 of the thimble enter and must be retained in the respective pipe ends. The thimble or sleeve is centered or held (so as to prevent excessive movement into one pipe such that it would be drawn out from the other) by a collar, band or shoulder 19 against whose faces 20 and 21 the packing seals.

The ends of the pipe are drawn together to engage the packing and seal against it, as well as to seal the packing against the shoulder by coupling 22 comprising a threaded male member 23, a sleeve 24 flanged at 25 and a female coupling member 26 inwardly flanged at 27.

The male member 23 and the sleeve 24 are extended sufficiently away from the joint to permit fastening them to the pipe ends by screws 28, 28′, of which four are shown in each position of Figures 1 and 7, and of which two additional or anchoring screws are shown in member 23′ in Figures 5 and 6. These screws may be of any suitable type, whether set screws, machine screws or otherwise and may have fillister heads if desired. Where it is intended to improve the appearance they will be flush with the surface of the coupling or union as in Figure 7.

In Figure 7 the same general form is used as in Figures 1 and 5 but one of the members preferably the male, $23^2$ is extended to cover and stiffen the actual joint. The collar $24^2$ is thus shortened and set back from the end of the pipe. With this form the flange 25 of the collar can be omitted and flange $27^2$ of the female member 26′ can conveniently engage with the rear end of the collar $24^2$.

This over-reach of members $26^2$ gives another reason for making screws 28′ flush with the sleeve.

The female member threads upon member $23^2$ as in the other forms, adding the stiffness of the threaded joint to the double stiffening given by the thimble on the inside and the male member on the outside on both sections of pipe at the joint.

The coupling members are mounted upon the pipe after which the sleeve or thimble with the gaskets or packing rings upon it is inserted between the pipe ends and the coupling members are slid to position for engagement.

The play given by the union type of coupling avoids the considerable difficulty present with long pipe sections of maneuvering the pipe ends to secure sufficient alignment for the sleeve coupling and pipe threads to engage.

My form of joint requires no preliminary treatment of the pipe except the filing or other facing of the ends of the pipe and avoids the expense and trouble on the job incident to the threading of pipe. The saving of threading presents a considerable item of time, trouble and expense to the user who has to fit the pipe, particularly if he has but few uses for the larger sizes of pipe dies and must purchase dies for a few uses only.

The hold of the screws against the pipe has been found to be strong enough to insure tight joints with any desired degree of permanence, depending for this upon the character of packing selected.

It will be evident that the disclosure of my invention will suggest to those skilled in the art other forms in which part or all of the benefit may be attained but which do not copy my invention. For this reason I purpose covering herein all such modifications and changes as come within the reasonable spirit and scope of my invention.

Having thus described my invention, what I claim as new and desire to secure by Letters Patent is:—

A joint for connecting open pipe ends of uniform external diameter without the need for threading the pipe ends and comprising a thimble fitting into the open ends and having an intermediate outwardly extending flange between the ends, packing upon the thimble for sealing against the flange and the pipe ends, a sleeve telescoping over one end, a portion of the flange and the intermediate packing, a screw radially through the sleeve engaging the said pipe end to fasten the sleeve from movement longitudinally of the pipe, a second sleeve telescoping over the other pipe end, a portion of the flange and the intermediate packing, a screw radially fastening the second sleeve to the end of the second pipe, external threads upon the first sleeve and a third sleeve loosely surrounding the second sleeve, internally threaded to fit the threads upon the first sleeve and having an inward flange adapted to forwardly engage a rearwardly directed face of the second sleeve.

SAMUEL M. KASS.